United States Patent
Abeta et al.

(10) Patent No.: US 8,299,743 B2
(45) Date of Patent: Oct. 30, 2012

(54) MACHINE TOOL AND CONTROLLING METHOD THEREOF

(75) Inventors: Satoshi Abeta, Chita (JP); Toshihiro Yonezu, Nishio (JP)

(73) Assignee: JTEKT Corporation, Osaka-shi (JP)

( * ) Notice: Subject to any disclaimer, the term of this patent is extended or adjusted under 35 U.S.C. 154(b) by 403 days.

(21) Appl. No.: 12/685,996

(22) Filed: Jan. 12, 2010

(65) Prior Publication Data
US 2010/0188035 A1    Jul. 29, 2010

(30) Foreign Application Priority Data

Jan. 29, 2009 (JP) ................. 2009-018168
Jan. 29, 2009 (JP) ................. 2009-018196

(51) Int. Cl.
*G05B 19/25* (2006.01)
(52) U.S. Cl. .......... 318/570; 318/639; 318/801
(58) Field of Classification Search .......... 318/570, 318/639, 801, 569, 609, 567, 630, 575, 600; 700/174
See application file for complete search history.

(56) References Cited

U.S. PATENT DOCUMENTS

| | | | |
|---|---|---|---|
| 4,974,165 A | 11/1990 | Locke et al. | |
| 5,056,038 A | 10/1991 | Kuno et al. | |
| 5,562,526 A | 10/1996 | Yoneda et al. | |
| 5,986,422 A * | 11/1999 | Iwashita et al. | 318/567 |
| 2008/0120566 A1 * | 5/2008 | Iwashita et al. | 715/771 |

OTHER PUBLICATIONS

Extended Search Report issued Aug. 2, 2011 in European Application No. 10151951.0.
U.S. Appl. No. 12/686,108, filed Jan. 12, 2010, Yonezu, et al.

* cited by examiner

*Primary Examiner* — Karen Masih
(74) *Attorney, Agent, or Firm* — Oblon, Spivak, McClelland, Maier & Neustadt, L.L.P.

(57) ABSTRACT

A machine tool a tool includes a supporting member relatively movable to a workpiece along a predetermined axis, a servo motor configured to drive the tool supporting member to the workpiece along the predetermined axis, a sizing sensor configured to measure a profile of the workpiece and to output a size deviation of measured values from a target profile, and a position detector configured to detect at least one of a relative position of the tool supporting member to the workpiece and a rotational position angle of the servo motor. The a servo driver is configured to drive the servo motor, and has a first feedback control having an output based on the size deviation, and a second feedback control based on an output of the position detector. The servo drives the servo motor by combining the outputs of the first and second feedback controls.

10 Claims, 10 Drawing Sheets

MACHINE TOOL AND CONTROLLING METHOD THEREOF

INCORPORATION BY REFERENCE

The present application claims priority under 35 U.S.C. §119 to Japanese Patent Applications No. 2009-018168, filed on Jan. 29, 2009 and No. 2009-018196, filed on Jan. 29, 2009. The contents of these applications are incorporated herein by reference in the entirety.

BACKGROUND OF THE INVENTION

1. Field of the Invention

The present invention relates to a machine tool and a machining method thereof, especially a machine tool having a servo motor moving a tool supporting member, and a servo driver driving the servo motor.

2. Description of the Prior Art

It is well known that there are several machine tools controlling a servo motor to move a wheel slide (defined as a "tool supporting member" here) by a servo motor, for example that disclosed in laid-open patent publication Tokkai 2005-327191. In this disclosed prior machine tool, a feedback control is executed by detecting a position of the tool supporting member such as by a rotational angle of the servo motor or a linear position of a linear scale. Namely, the feedback control is executed by the position of the tool supporting member so that tool supporting member is moved to a desired position by the feedback control of the position of the tool supporting member.

A tool or a workpiece machined by the tool is slightly deformed to be bent by machining stress because of its flexibility. Also, there is some thermal distortion in the tool or the workpiece by machining. Any influence by the deformation or the thermal distortion of the tool or the workpiece can not removed by the feedback control in the prior art. Therefore, a higher accuracy machining of the workpiece can be achieved by checking these influences.

It is also well known that there are several machine tools having a sizing device measuring a diameter of the workpiece, for example measuring an inner diameter, as disclosed in another laid-open patent publication Tokkai 2005-279882. In this another prior art, it is disclosed that a process change is performed at a timing determined by an inner diameter of the workpiece measured by the sizing device. The process is changed when a measured value by the sizing device reaches a predetermined value. For example, it is changed from a rough grinding process to a precise grinding process or from a precise grinding process to a finish grinding process.

Inventors of the present invention conceived that machining in consideration of these influences, including the slight deformation or the thermal distortion of the tool or the workpiece, is performed by driving the servo motor on the basis of information measured by the sizing device in order to achieve more precise machining. Inventors of the present invention also conceived to be able to achieve a higher responsiveness of driving the servo motor on the basis of the measured information by the sizing device than that executing the feedback control by detecting information of the position detector, such as the linear scale, etc.

However, the sizing device in the prior art has a construction to output a signal only when the sizing value reaches to the predetermined value because of its purpose to change these processes.

SUMMARY OF THE INVENTION

In view of the previously mentioned circumstances, it is an object of the present invention to provide a machine tool and a controlling method thereof which can execute to machine the workpiece more precisely.

In order to achieve the above and other objects, one aspect of the present invention provides a machine tool mainly including a sizing sensor measuring a profile of a workpiece machined by a tool and outputting a size deviation of measured values from a target profile, and a servo driver driving a servo motor, which moves the tool to the workpiece relatively, in a feedback control based on the size deviation being output from the sizing sensor. Thereby, the present invention can machine the workpiece with higher accuracy even though there is any slight deformation or thermal distortion of the tool or the workpiece by the feedback control based on the size deviation. Also, since the feedback control is directly executed by the size deviation measured by the sizing sensor, it can have higher responsiveness to the measured value itself, thereby to achieve more accurate and high speed machining.

In the feedback control, the bigger the gain value of the position control, the sooner the time of reaching the final diameter, but with a risk of overshooting beyond the target, whereby there occurs an undercut and the workpiece becomes defective. On the contrary, the smaller the gain value of the position control, the longer the time for reaching the final diameter. Therefore, the gain value of the position control is a key factor of feedback control. Where a diameter of the workpiece is relatively small, that is to say where rigidity of the workpiece W is small and flexible, the workpiece is deformed to a curve because of the high flexibility. Therefore, even though the tool is advanced to a predetermined location, the workpiece is not ground to a predetermined value. This situation is also dependent on a degree of sharpness of a cutting edge of the tool. That is, where there is a poor sharpness of the cutting edge, a predetermined removal volume is not achieved even though the tool is advanced to the predetermined location. The suitable gain value of the position control is variable according to various kinds of factors.

Therefore, the second aspect of the present invention according to the first aspect provides a gain of the position control in the feedback control being set prior to machining of workpieces by the tool. Thereby, the gain of the position control can be set in accordance to the workpiece or the tool so that it can achieve higher machining accuracy and higher speed machining.

The rigidity of the workpiece and the sharpness of the cutting edge of the tool are changeable even during grinding. The diameter of the workpiece becomes gradually smaller in accordance with a progress of the machining and the sharpness of the cutting edge of the tool is gradually worse in accordance with the progress of the machining. The greater a number of the machined workpieces W by the same tool, the worse the sharpness of the cutting edge of the tool. Therefore, the third aspect of the present invention according to the first aspect is that the gain of the position control is variable so that the gain of the position control can be set in accordance with updating of the machining status.

The fourth aspect of the present invention according to the first aspect provides a second feedback control in adding to the first feedback control in the first aspect of the present invention, the second feedback control controls the servo driver on a basis of information of a relative detected position of the tool to the workpiece by a position detector, as a result of which the servo driver switches from the second feedback control to the first feedback control.

The servo driver in the present invention executes the second feedback control until the tool contacts the workpiece. Then the servo driver executes the first feedback control after the tool contacted the workpiece. Thereby, the servo driver drives the servo motor at a time when the second feedback control can be executed, so that the movement of the tool controlled in the second feedback control can be executed at high speed and high accuracy. Also, the first feedback control can be executed at a time when the diameter of the workpiece is actually reducing after the tool starts to machine the workpiece. Therefore, the first and the second feedback controls are executed certainly so that each of effects of the first and second feedback control can be achieved.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Embodiments of the machine tool according to the present invention will be explained hereinafter with reference to the Figures. One example of the machine tool according to the present invention is explained with reference to a grinding machine.

First Embodiment of the Present Invention

[Mechanical Construction of the Grinding Machine]

Figure 1:
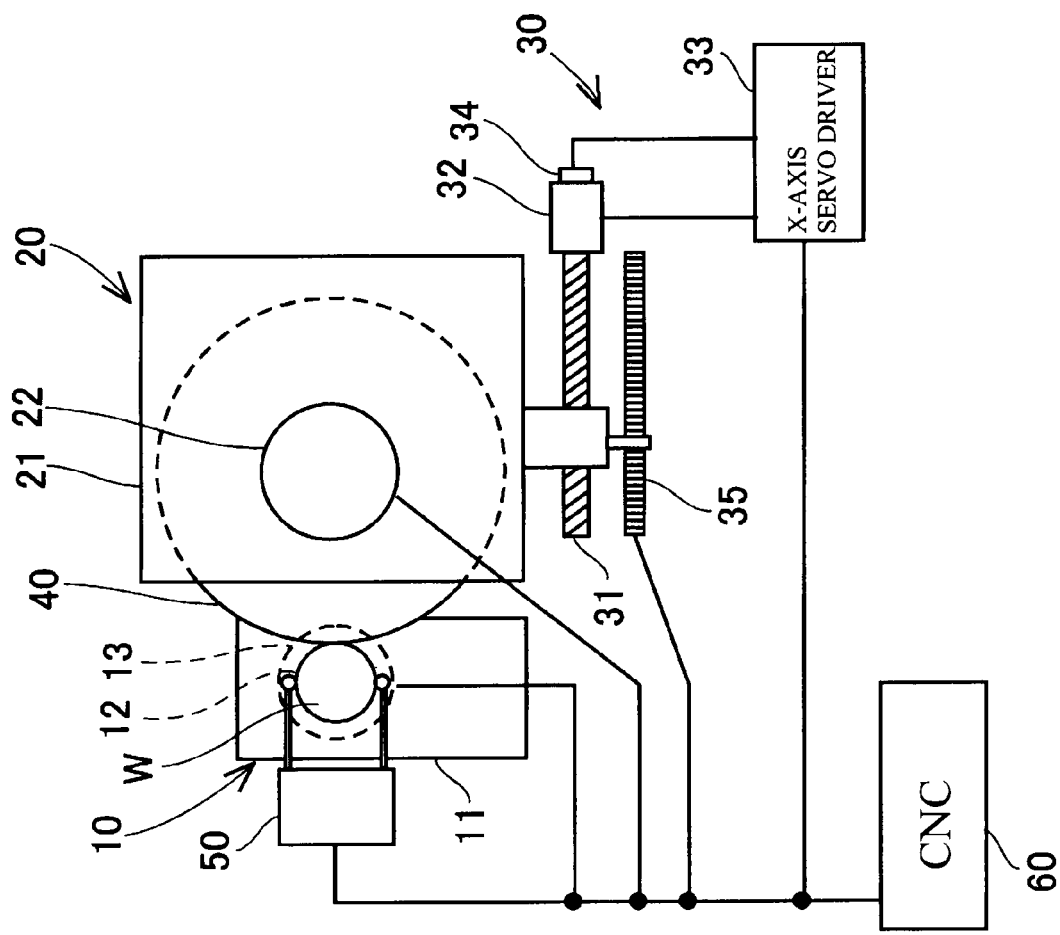
FIG. 1 is a overview of the grinding machine.
Figure 2:
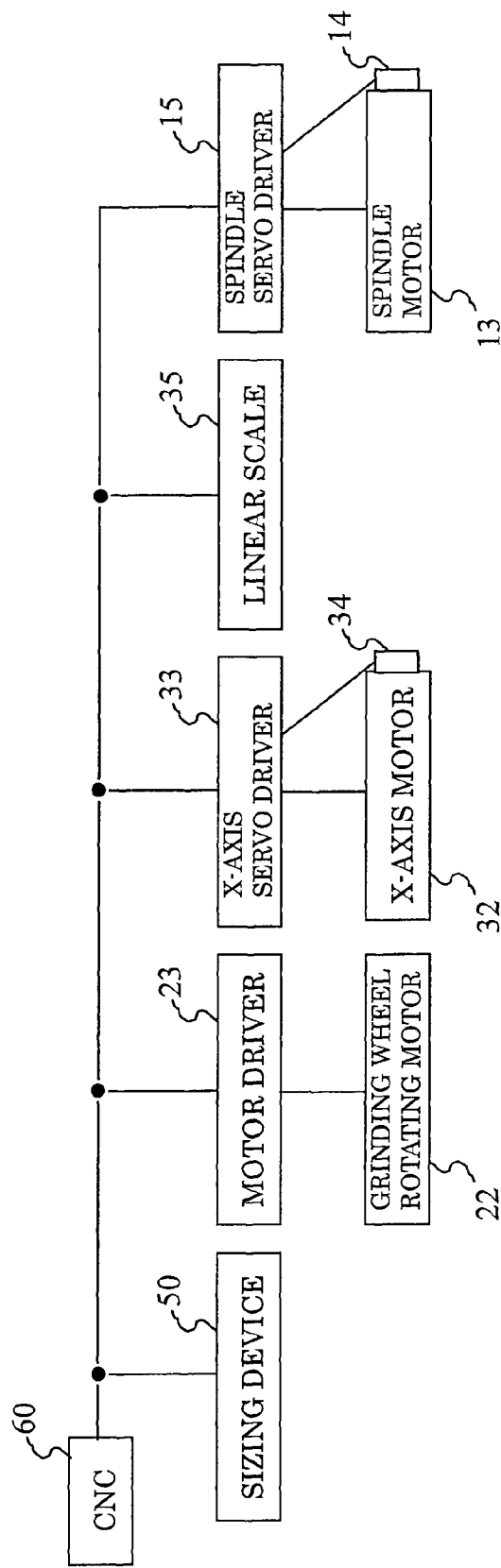
FIG. 2 is a connecting construction of the grinding machine.

The machine construction of the grinding machine of the first embodiment according to the invention is explained herein while referring to FIG. 1 and FIG. 2.

As shown in FIG. 1, the grinding machine provides a spindle device 10, a grinding wheel supporting device 20, a wheel head driving device 30, a grinding wheel 40, a sizing device 50 and a CNC (Computer Numerical Controller) 60. A workpiece W ground by the grinding machine is a longitudinal cylindrical shaft and the grinding machine performs grinding to machine a peripheral surface of the workpiece W.

The spindle device 10 includes a head stock 11, a spindle 12, a spindle motor 13, a spindle encoder 14 and a servo driver 15 for the spindle. The head stock 11 is mounted on an un-illustrated bed. The spindle 12 is supported rotatably around an axis parallel to a Z-axis by penetrating through the spindle head 11. On the spindle 12 is mounted a chuck holding one axial end of the workpiece W. The spindle encoder 14 detects a rotational angle of the spindle motor 13. The spindle servo driver 15 supplies electrical power to the spindle motor 13 on a basis of a commanded value output from the CNC 60 in order to drive the spindle motor 13 rotatably.

The grinding wheel supporting device 20 corresponds to "a tool supporting member" of this invention and includes a wheel slide 21, a grinding wheel rotating motor 22 and a motor driver 23. The wheel slide 21 supports a disk-like grinding wheel 40 rotatably around an axis parallel to the Z-axis and is movable along an X-axis direction and the Z-axis direction to the workpiece W held by the spindle chuck. The wheel slide 21 corresponds to "a tool" of this invention. The grinding wheel rotating motor 22 is mounted on the wheel slide 21 and rotates the grinding wheel 40. The motor driver 23 drives the grinding wheel rotating motor 22 in accordance with a commanded value of rotation being output from the CNC 60 such that a rotational number of the grinding wheel rotating motor 22 coincides with the commanded value of the rotation. In general, the commanded value of the rotation is constant.

The wheel slide driving device 30 moves the wheel slide 21 along the X-axis direction and the Z-axis direction relative to the workpiece W. FIG. 1 shows only a moving construction of the wheel slide driving device 30 along the X-axis. The wheel slide driving device 30 includes an X-axis ball screw 31, an X-axis motor 32, an X-axis servo driver 33, an X-axis encoder 34 and a linear scale 35. The X-axis motor 32 corresponds to "a servo motor" of the present invention. The X-axis encoder 34 corresponds to "a position detector" of the present invention, detecting a rotational position angle of the X-axis servo motor 32. The linear scale 35 also corresponds to "the position detector" of the present invention, detecting a relative position of the grinding wheel supporting device 20 to the workpiece W along the X-axis.

The X-axis ball screw 31 is supported on a bed rotatably around the X-axis. A nut member of the X-axis ball screw 31 is fixed to the wheel slide 21. The X-axis motor 32 drives the X-axis ball screw 31 rotatably. Therefore, the X-axis motor 32 moves the wheel slide 21 against the workpiece W along the X-axis direction through the X-axis ball screw 31. The X-axis servo driver 33 drives the X-axis motor 32 in accordance with a commanded value being output from the CNC 60 by supplying electrical power to the X-axis motor 32. The X-axis encoder 34 detects a rotational angle of the X-axis motor 32. The linear scale 35 is mounted on the bed and detects a position of the wheel slide 21 along the X-axis against the bed.

The structure for moving the wheel slide 20 against the workpiece W along the Z-axis direction has not been illustrated but this structure is substantially the same as that for the X-axis direction movement.

The sizing device 50 measures a machined profile of the workpiece W, that is to say a diameter of the workpiece W. That is, the sizing device 50 measures a deviation of the value of the machined profile from a target value set in the sizing device 50 in advance. The deviation is defined as "a size deviation" hereinafter. The sizing device 50 corresponds to "a profile measuring sensor" of the present invention. The target value or a target profile is a finished diameter of the workpiece by machining so that the size deviation corresponds to a remaining diameter to be machined in transition to the finished diameter of the workpiece W. The sizing device 50 outputs a size signal to the CNC 60 and the X-axis servo driver 33 through a high speed synchronized communication network 70 shown in FIG. 2 where the measured size deviation coincides to one of a plurality of predetermined sizes. A size value of the size signal is a criterion value to initiate a gain adjustment of the first and the second gain adjustment portions 107, 103. The size value of the size signal corresponds to a process change of coarse grinding, precise grinding and micro grinding as explained hereinafter. Further, the sizing device 50 outputs the measured size deviation to the X-axis servo driver 33 through the high speed synchronized communication network 70 shown in FIG. 2 in synchronism with the reference signal being output from the CNC 60.

The CNC 60 outputs command values to each of servo drivers 15, 33 and the motor driver 23 in accordance with machining programs to control the X-axis motor 32 and the spindle motor 13. The CNC 60 functions as a master to output periodic reference signals to any slaves being connected to the high speed synchronized communication network 70.

As shown in FIG. 2, to the high speed synchronized communication network 70 are respectively connected the CNC 60 as the master, and the spindle encoder 14, the spindle servo driver 15, the grinding wheel rotating motor driver 23, the X-axis servo driver 33, the X-axis encoder 34, the linear scale 35 and the sizing device 50 as the slaves. These master and slaves connected to the high speed synchronized network 70 are communicated and processed with each other synchronously. As the high speed synchronized communication network 70, there may be adopted a real time "Ethernet" (registered as a Trademark).

"Operation of the Master and the Slaves"

The operation of the master and the slaves of the present invention will be explained hereinafter with reference to FIG. 3.

Figure 3:
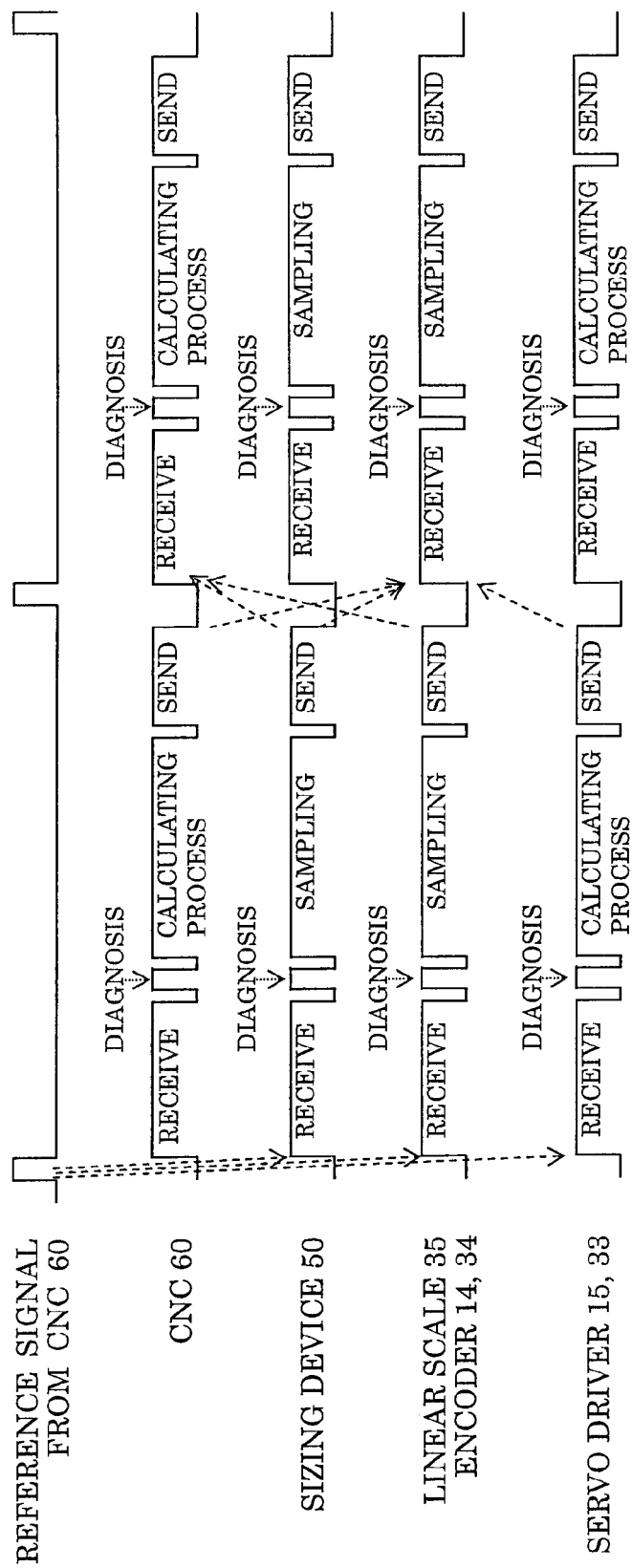
FIG. 3 is a timing chart of a master and slaves constructing the grinding machine.

As shown in the first line of FIG. 3, the CNC 60 as the master outputs the periodic reference signals to each of the slaves. As shown in the second line of FIG. 3, the CNC 60 executes a reception process to receive various signal from other slaves after the CNC 60 outputs the reference signals. The CNC 60 receives the sizing signal from the sizing device 50 for example. After that, the CNC 60 executes a diagnosis process and a calculation process, then executes a transmission process to send position commanded values to the servo drivers 15, 33.

As shown in the third line of FIG. 3, after the sizing device 50 receives the reference signal from the CNC 60, the sizing device 50 executes the diagnosis process and a sampling process to measure an outer diameter of the workpiece W, and then executes a data transmission process to the X-axis servo driver 33 until receiving the next reference signal.

As shown in the fourth line of FIG. 3, after the X-axis encoder 34 and the linear scale 35 receive the reference signal from the CNC 60, the X-axis encoder 34 and the linear scale 35 execute a diagnosis process and a sampling process to detect respectively a rotational angle of the X-axis motor 32 and an X-axis position of the wheel slide 21, then execute a data transmission process to the X-axis servo driver 33 until receiving the next reference signal. As shown in the fourth line of FIG. 3, after the spindle encoder 14 receives the reference signal from the CNC 60, the spindle encoder 14 executes a diagnosis process and a sampling process to detect a rotational angle of the spindle motor 13, then executes a data transmission process to the X-axis servo driver 15 until receiving the next reference signal.

As shown in the fifth line of FIG. 3, each of servo drivers 15, 33 receives signals transmitted from other slaves upon receiving the reference signal from the CNC 60. Then, each of servo drivers 15, 33 executes the diagnosis process and the calculating process to execute the transmission process sending necessary information to the master or the slaves. Each of servo drivers 15, 33 executes not only the above-identified processes but also a driving process for each of motors 13, 32.

To each of the master and the slaves is set an opponent device executing the reception process and the transmission process simultaneously. In other words, the master and each of the slaves execute the data reception and transmission process directly to the other corresponding master or slaves which is the opponent device.

"Control Block Diagram for the X-Axis Servo Driver 33"

Figure 4:
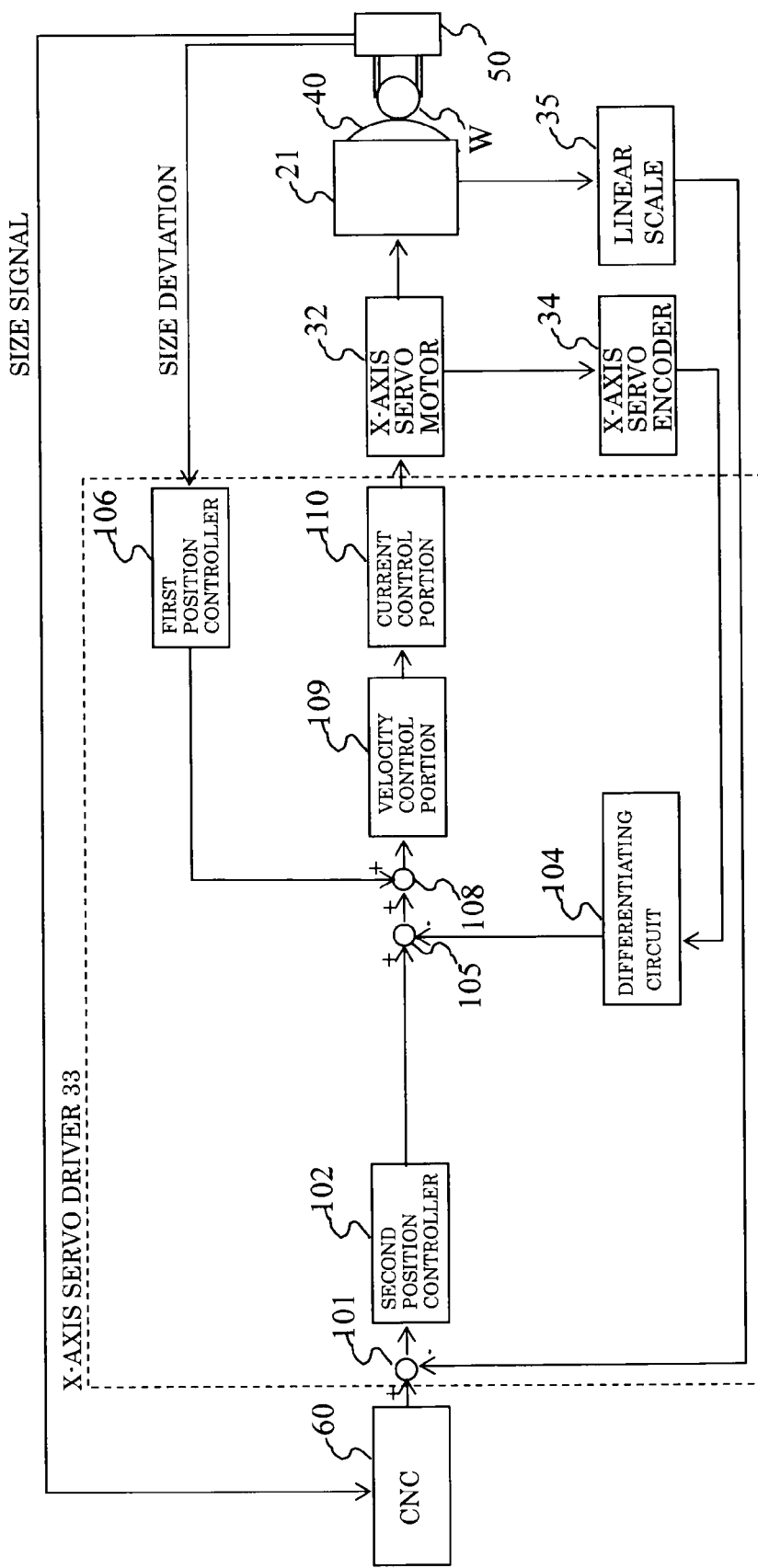
FIG. 4 is a block diagram of an X-axis servo driver 33 in first embodiment of the present invention.

Next referring to FIG. 4, the X-axis servo driver 33 will be explained hereinafter. FIG. 4 refers to the first embodiment mainly, but the first gain regulation portion 107 and the second gain regulation portion 103 exclusively refer to the second embodiment. Therefore the X-axis servo driver 33 of the first embodiment will be explained with reference to FIG. 4 except for the first gain regulation portion 107 and the second gain regulation portion 103.

As shown in the control block diagram of FIG. 4, the X-axis servo driver 33 consists of a subtracting circuit 101, first and second position control portions 106, 102, a differentiating circuit 104, a subtracting circuit 105, an adding circuit 108, a velocity control portion 109 and a current control portion 110.

The X-axis servo driver 33 executes first feedback control driving the X-axis servo motor 32 to make the size deviation measured by the sizing device 50 zero, and second feedback control driving the X-axis servo motor 32 on a basis of detected information by the X-axis encoder 34 and the linear scale 35. In the second embodiment of the present invention, especially the X-axis servo driver 33 executes switching from the second feedback control to the first feedback control as explained in the second embodiment.

The first feedback control is executed by the first position control portion 106, the adding circuit 108, the velocity control portion 109 and the current control portion 110. The second feedback control is executed by the subtracting circuit 101, the second position control portion 102, the differentiating circuit 104, the subtracting circuit 105, the velocity control portion 109 and the current control portion 110.

Each construction will be explained here.

The first position control portion 106 executes position controls, for example proportional position control, based on the size deviation being output from the sizing device 50 to output a commanded velocity value. The value of the position control gain, for example proportional gain, is set previously and is not variable after being set in the first embodiment of the present invention.

The subtracting circuit 101 calculates a position deviation of a present position of the wheel slide 21 detected by the linear scale 35 from the commanded position value being output from the CNC. The second position control portion 102 executes position controls, for example proportional position control, on a basis of the position deviation calculated by the subtracting circuit 101, to output a commanded velocity value.

The differentiating circuit 104 calculates a differential value of the rotational angle of the X-axis motor 32, detected by the X-axis encoder 34, as a rotational angle velocity of the X-axis motor 32. The subtracting circuit 105 calculates a velocity deviation of the rotational angle velocity calculated by the differentiating circuit 104 from the commanded velocity being output from the second position control portion 102.

The adding circuit 108 adds the velocity deviation being output from the subtracting circuit 105 to the commanded velocity value being output from the first position control portion 106. Therefore, the velocity control portion 109 executes a velocity control, such as proportional differential control, based on the commanded velocity value being output from the adding circuit 108. The velocity control portion 109 outputs the commanded current value corresponded to a commanded torque value. The current control portion 110 executes a current loop control on a basis of the commanded current value being output from the velocity control portion 109 in order to supply power to the X-axis servo motor 32.

"Operation of the First and the Second Feedback Controls"

Referred to FIG. 5 the operation of the first and the second feedback controls will be explained hereinafter. In FIG. 5a and FIG. 5b a lateral axis is time and a vertical axis is the outer diameter of the workpiece W.

First of all, the second feedback control will be explained referring to FIG. 5a. The sizing device 50 outputs the size signals P1, P2, P3. The size signal P3 is the size signal to switch from the coarse grinding process to the precise grinding process. The size signal P2 is the size signal to switch from the precise grinding process to the micro grinding process. The size signal P1 is the size signal to reach a finished size.

In the second feedback control, the commanded position value being output from the CNC 60 is switched on a basis of the size signals P1, P2, P3. The CNC 60 outputs the commanded position value in each interval from P3 to P2 and from P2 to P1 such that the moving velocity of the wheel slide 21 along the X-axis corresponds to each of the precise grinding process and the micro grinding process. Actually, CNC 60 outputs the commanded position value to switch the moving velocity of the wheel slide 21 along the X-axis when the size signal P3 or P2 is output. The X-axis servo motor 32 is controlled according to the commanded position value from the CNC 60 in the second feedback control.

The first feedback control will be explained referring to FIG. 5b. The first feedback control is started when the size signal P3 is output from the sizing device 50. The value of the position control gain in the first position control portion 106 is set previously and is not variable after being set, as explained above. This gain value is shown in FIG. 5b as a solid line, a dotted line or an alternate long and short dashed line. One of the solid line, the dotted line or the alternate long and short dashed line is selected when an operator sets the gain value in the first position control portion 106. The gain value being set in the position control portion 106 is largest in the solid line, larger in the dotted line and smallest in the alternate long and short dashed line.

Figure 5B:
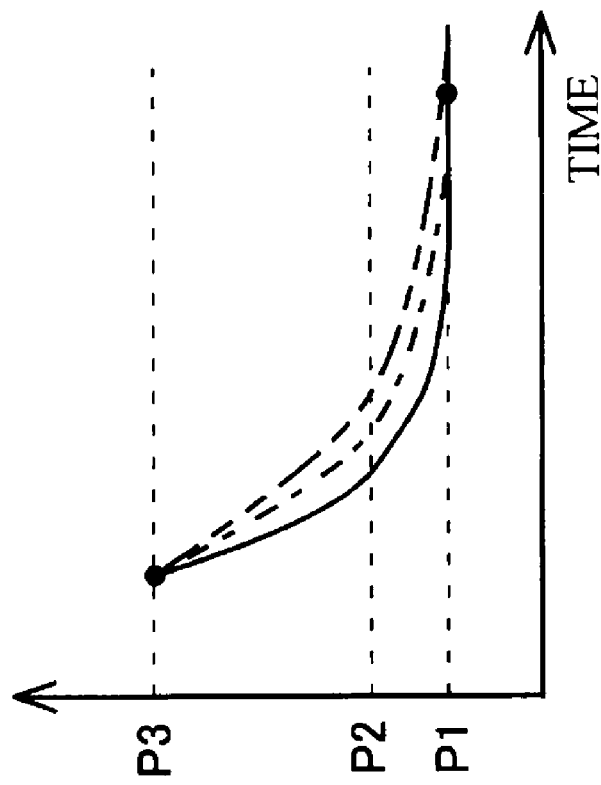
FIG. 5b is a graph showing changing status of the outer diameter of the workpiece according to a time passing in the first feedback control.
Figure 5A:
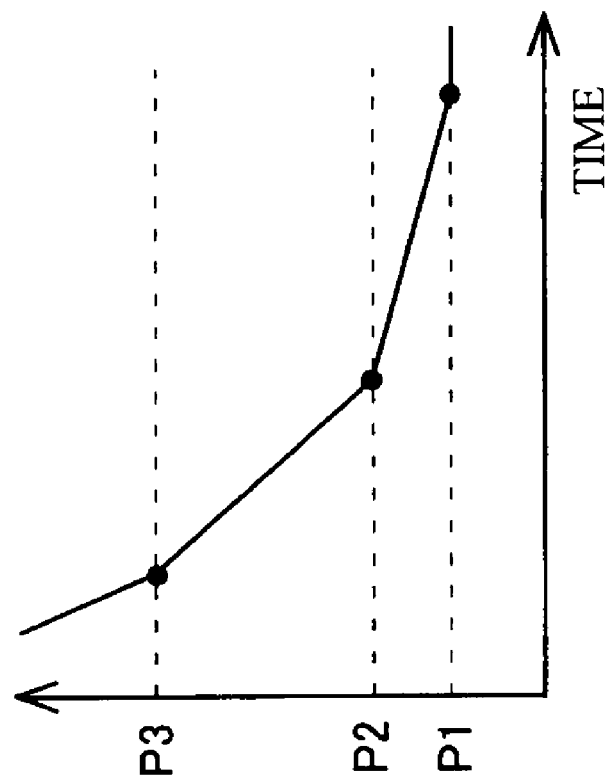
FIG. 5a is a graph showing a changing status of the outer diameter of the workpiece according to a time passing in the second feedback control.

In the first feedback control explained above, the diameter of the ground workpiece W is gradually and smoothly reduced along the smooth line from the diameter corresponding to the size signal P3 to the diameter corresponding to the size signal P1 as shown in each line of the FIG. 5b. Also, a time to reach to the finished diameter is shorter in accordance with the larger gain value being set in the first position control portion 106. If the input value from the second position control portion 102 to the adding circuit 108 is zero in the second feedback control, the X-axis servo motor 32 can be controlled by only the size deviation from the sizing device 50 in the first feedback control.

The grinding wheel 40 is advanced at a rapid feed velocity to the workpiece W by the rotational driving of the X-axis servo motor 32, then at a coarse feed velocity of the coarse feed process to grind the workpiece W coarsely by being controlled by the second feedback control. The sizing device 50 is advanced to contact an outer peripheral surface of the workpiece W in order to measure the outer diameter of the ground workpiece W and outputs the size signal P3 when the diameter of ground workpiece W reaches a position corresponding to the size signal P3. Based on the size signal P3, the first feedback control is started to execute to control the rotation of the X-axis servo motor 32, therefore, the X-axis servo motor 32 is controlled by the first and the second feedback controls by the adding circuit 108.

In the final stage of the above grinding process, where the wheel slide 21 reaches the most advanced position, the substituting circuit 101 outputs zero so that the input value from the substituting circuit 105 to the adding circuit 108 in the first feedback control is zero. In this instance, the ground diameter of the workpiece W will be the final diameter ideally, however the size deviation from the sizing device 50 does not reach zero actually because the relatively long workpiece W has flexibility to be deformable along the X-axis direction due to grinding resistance. Therefore, the sizing device 50 still outputs the actual value of the size deviation corresponding to the deformed value in the first feedback control so that the wheel slide 21 moves toward the workpiece W, to grind the remaining value of the workpiece W to the final diameter corresponding to the size signal P1 while being controlled only by the first feedback control until the size deviation reaches to zero.

Effects of the First Embodiment of the Present Invention

The first embodiment of the present invention explained above has next effects.

The high speed simultaneous communication can be executed between the X-axis servo driver 33 and the sizing device 50 based on the reference signal from the CNC 60. By this construction, the X-axis servo driver 33 can execute the first feedback control on the basis of the size deviation being output from the sizing device 50.

The size deviation from the sizing device 50 includes information having influence due to mechanical deformation based on flexibility of the workpiece W and the grinding wheel 40, and its thermal deformation. Therefore, the grinding machine can grind the workpiece W more accurately using the first feedback control. Moreover, the first feedback control can provide high speed response to the measured value by the sizing device 50 because the first feedback control executes control directly by the measured value itself. Therefore, the grinding machine can grind the workpiece W with both more high accuracy and speed by the first feedback control.

The CNC 60 executes the function of the master. A CNC 60 is installed in almost all machine tools. Therefore, the communication master can be readily installed in any machine tool with a CNC, whereby the machine tool can have the versatility.

Variation of the First Embodiment of the Present Invention

In this another embodiment the gain value of the first position control portion 106 is set in accordance with the status of the grinding wheel 40 in grinding the workpiece W.

For example, the gain value of the first position control portion 106 is preset in the coarse grinding process where the grinding wheel 40 is grinding the workpiece W and is not thereafter varied in the precise grinding process and the micro grinding process. The gain value of the position control for the workpiece W which is being ground now is thereby suitably set in accordance with a stage of the actual grinding wheel 40.

Other Embodiment of the First Embodiment of the Present Invention

The gain value of the first position control portion 106 is set as explained previously but may be made variable. That is, the gain value of the first position control portion 106 may be variable with time or with the size deviation being output from the sizing device 50.

The rigidity of the workpiece W and the sharpness of the cutting edge of the grinding wheel 40 are changeable during grinding. The diameter of the workpiece W becomes gradually smaller in accordance with a progress of the grinding and the sharpness of the cutting edge of the grinding wheel 40 is gradually worse in accordance with the progress of the grinding. The greater a number of the ground workpieces W by the same grinding wheel 40, the worse the sharpness of the cutting edge of the grinding wheel 40. In the other embodiment, therefore, the gain value of the first position control portion 106 is set to the best gain value at the present status of the grinding. The changed amount per time of the size deviation substantially corresponds to the grinding resistance. Therefore, the gain value of the position control can be set suitably for the present grinding status.

Further Variation of the First Embodiment of the Present Invention

Figure 6:
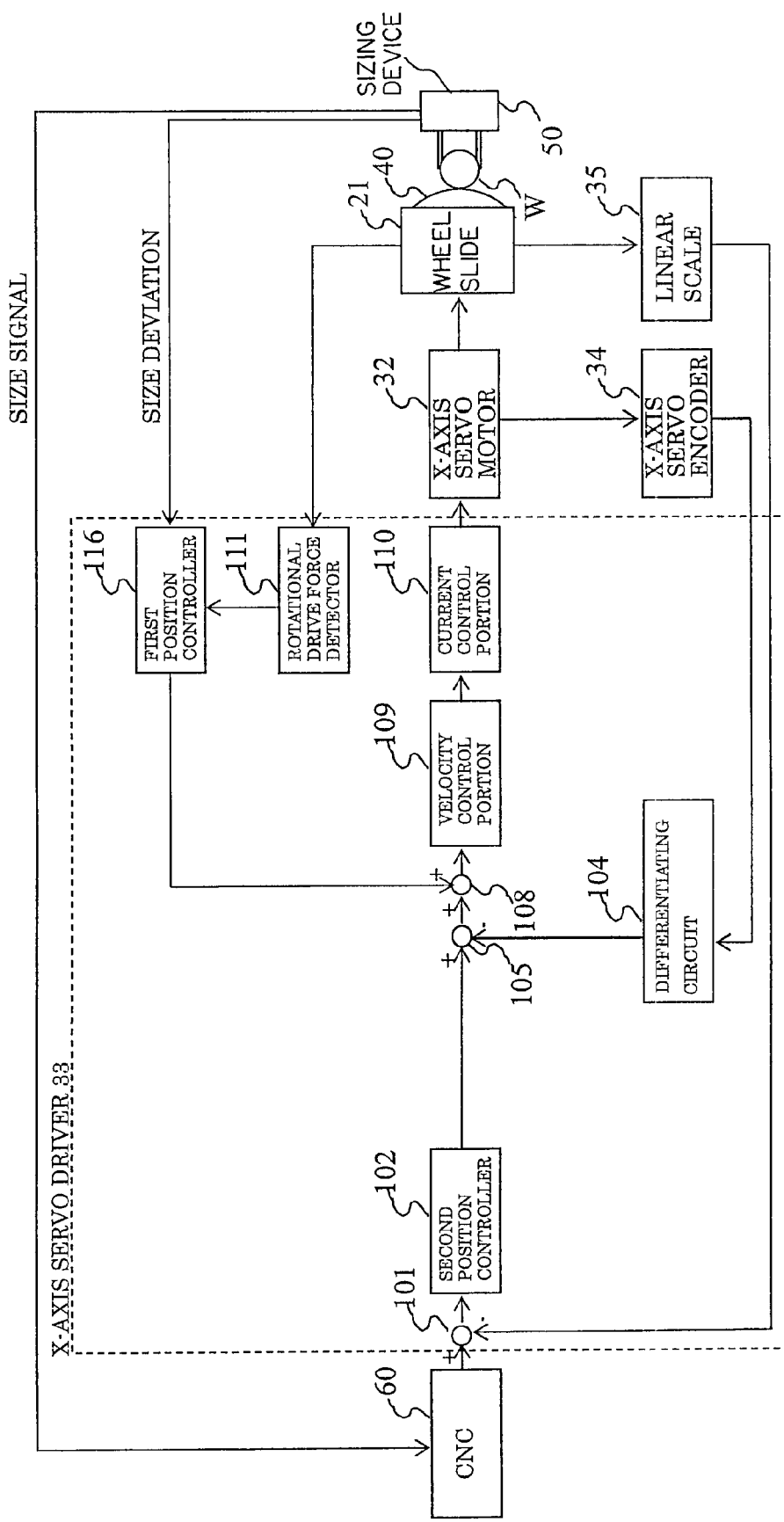
FIG. 6 is a block diagram of an X-axis servo driver 33 in a variation of the first embodiment of the present invention.

Next the grinding machine of a further variation of the first embodiment according to the present invention will be explained with reference to FIG. 6. The grinding machine in the further variation further includes a rotational driving force detection portion 111 to the X-axis servo driver 33 and has a different first position control portion 116 from the first position control portion 106 in the one embodiment of the first embodiment. The functions of the remaining elements of the first embodiment are unchanged. Therefore, only differences are explained hereinafter.

The rotational driving force detection portion 111 receives an input of current values charged in the grinding wheel rotation motor 22 through the high speed simultaneous communication network 70 to detect the rotational driving force of the grinding wheel 40 by the grinding wheel rotation motor 22. The current value charged in the grinding wheel rotation motor 22 is detected by an un-illustrated current sensor installed in the grinding wheel rotation motor 22. Therefore, information of the current is input into the rotational driving force detection portion 111 from the current sensor through the motor driver 23 and the high speed simultaneous communication network 70.

The first position control portion 116 sets the gain value of the position control in the first position control portion 116 to be variable according to the rotational driving force detected by the rotational driving force detection portion 111.

In this case, the rigidity of the workpiece W and the sharpness of the cutting edge of the grinding wheel 40 are changeable even in grinding, as explained above. Therefore, the gain value of the position control can be set suitably for the present grinding status because the gain value of the position control in the first position control portion 116 is set to be variable. Especially, the rotational driving force of the grinding wheel 40 is variable in accordance to the grinding resistance so that the gain value of the position control can be set suitably for the present grinding status because the gain value of the position control is set to be variable according to the rotational driving force.

Besides, while the rotational driving force detection portion 111 detects the rotational driving force of the grinding wheel 40 by the grinding wheel rotation motor 22 on a basis of the current values detected by the un-illustrated current sensor, the rotational driving force may be detected by a sensor mounted directly on a rotational shaft of the grinding wheel rotation motor 22 instead of using the current sensor.

Second Embodiment of the Present Invention

Figure 7:
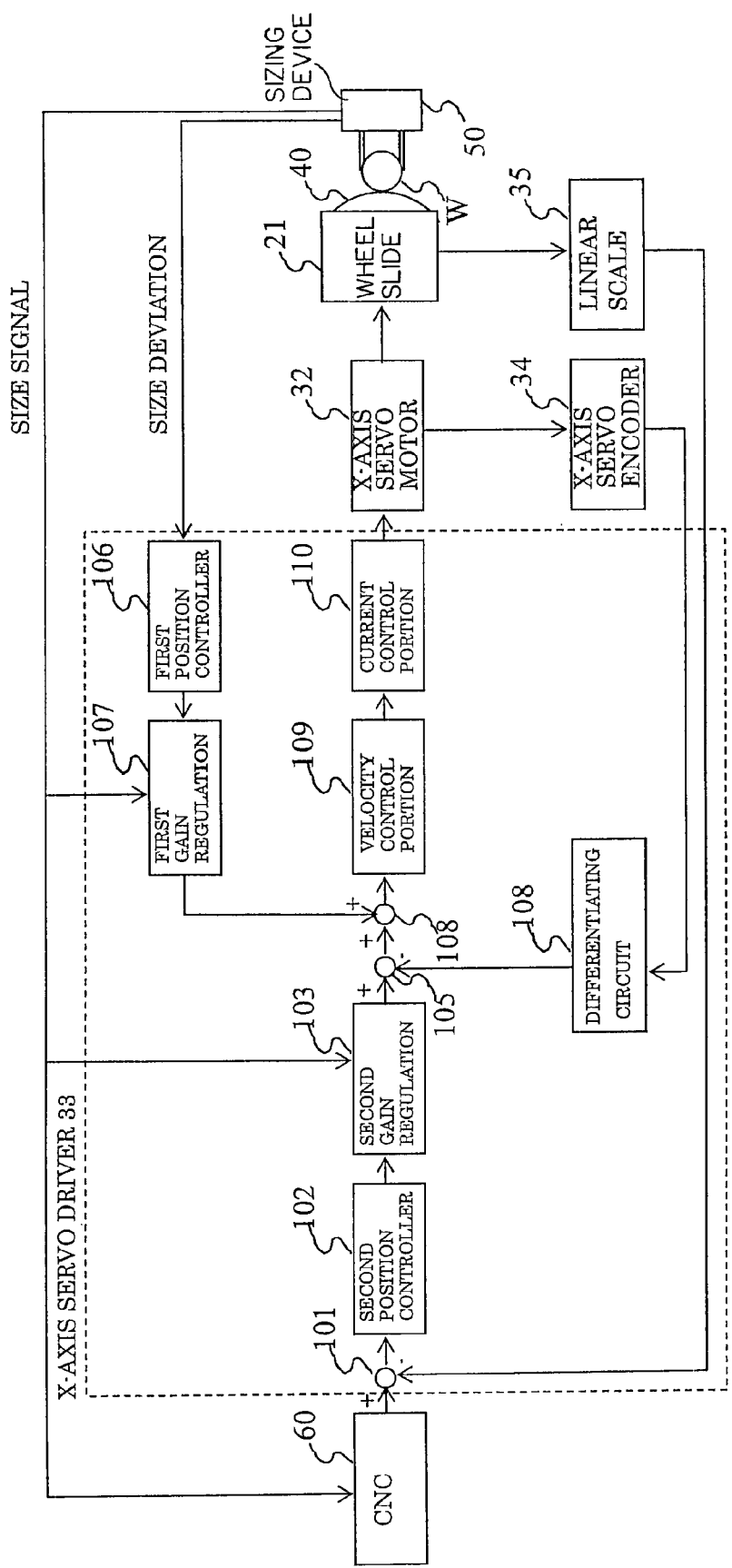
FIG. 7 is a block diagram of a X-axis servo driver 33 in second embodiment of the present invention.

Next the grinding machine of the second embodiment according to the present invention will be explained here in referring to FIG. 7. The grinding machine in the second embodiment further comprises first gain regulation portion 107 and second gain regulation portion 102 added to the X-axis servo driver 33 in the first embodiment. The functions of the remaining elements is unchanged. Therefore, only differences are explained hereinafter.

The first gain regulation portion 107 is installed between the first position control portion 106 and the adding circuit 108, and regulates a degree of influence to the first feedback control. Therefore, the first gain regulation portion 107 outputs a value multiplying the commanded velocity value being output from the first position control portion 106 by a value of a first gain. The value of the first gain is 0 (zero) to 1 (one), that is to say 0% to 100%. The first gain regulation portion 107 outputs to the next step the commanded velocity value being output from the first position control portion 106 where the value of the first gain is 100%. The first gain regulation portion 107 outputs zero value to the next step or does not output any value where the value of the first gain is 0%. The first gain regulation portion 107 sets 0% as the beginning value and increases it gradually from 0% to 100% as a dotted line shown in FIG. 8b explained later in detail. The first gain regulation portion 107 is initiated to increase from 0% of the value of the first gain by receiving the size signal P3 from the sizing device 50. Therefore, the degree of influence by the first feedback control is increased gradually after outputting the size signal P3 so that the influence to the first feedback control is regulated.

The second gain regulation portion 103 is installed between the second position control portion 102 and the adding circuit 105, and regulates a degree of influence to the second feedback control. Therefore, the second gain regulation portion 103 outputs a value multiplying the commanded velocity value being output from the second position control portion 102 by a value of a second gain. The value of the second gain is 0 (zero) to 1 (one), that is to say 0% to 100%. The second gain regulation portion 103 outputs to the next step the commanded velocity value being output from the second position control portion 102 where the value of the second gain is 100%. The second gain regulation portion 103 outputs zero value to the next step or does not output any value where the value of the second gain is 0%. The second gain regulation portion 103 sets 100% as the beginning value and reduces it gradually to 0% as a solid line shown in FIG. 8b explained later in detail. The second gain regulation portion 103 is initiated to reduce 100% of the value of the second gain by receiving the size signal P3 from the sizing device 50. Therefore, the degree of influence by the second feedback control is reduced gradually after outputting the size signal P3 so that the influence to the second feedback control is regulated.

Operation of the Second Embodiment of the Present Invention

Figure 8A:
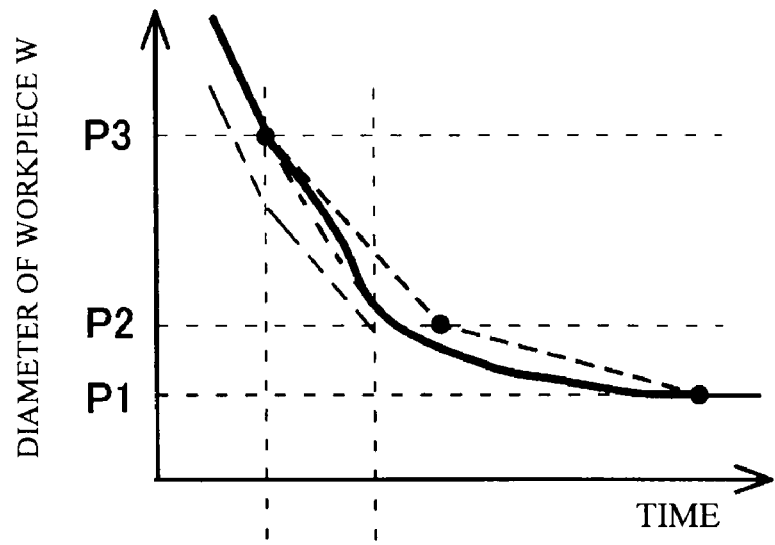
FIG. 8a is a graph showing a changing status of the outer diameter of the workpiece according to a time passing at switching from the second feedback control to the first feedback control in the second embodiment.
Figure 8B:
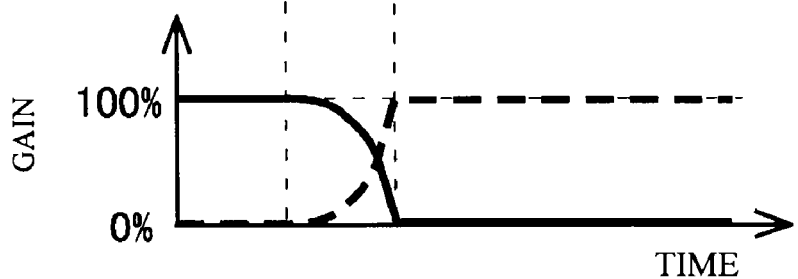
FIG. 8b is a graph showing a first gain and a second gain.

The operation of the same parts in the second embodiment is same as that in the first embodiment and will not be explained. Therefore, only differences are explained hereinafter, especially focusing on switching from the second feedback control to the first feedback control referred to FIG. 8. In FIG. 8a, a solid line shows a status change by the second embodiment, a dotted line shows a status change by the first feedback control only and an alternate long and short dashed line shows a status change by the second feedback control only. For a convenience, a long dashed double short dashed line shows a status change of the position demanded value from the CNC 60. In FIG. 8b, the solid line shows the second gain and the dotted line shows the first gain as explained above. The lateral axis of the time in FIG. 8b corresponds to that in FIG. 8a.

As explained above, the first gain is preset to be zero (0%) until the size signal P3 is output. After the size signal P3 is output, the first gain is increased gradually to 100% until a predetermined time is passed as shown by the dotted line in FIG. 8b. An increasing rate of the first gain is small in the beginning and becomes larger in accordance with time passing.

On the other hand, as explained above, the second gain is preset to be 100% until the size signal P3 is output. After the size signal P3 is output, the second gain is decreased gradually to 0% until the predetermined time is passed as shown by the alternate long and short dashed line in FIG. 8b. A decreasing rate of the second gain is small in the beginning and becomes larger in accordance with time passing.

Therefore, the first gain is increasing gradually at the same time that the second gain is decreasing gradually after the size signal P3 is output so that switching of the influence to feedback controls from the second feedback control to the first feedback control is switched gradually.

Where the values of the first gain and the second gain are changed gradually, the output from the adding circuit 108 is changed gradually in order to decrease the infeed velocity of the wheel slide 21 to grind the workpiece W so that the changing status of the workpiece diameter is traced to the solid line as shown in FIG. 8a. In other words, the diameter of workpiece W is changed in tracing the changing status in the second feedback control until the size signal P3 is output. The diameter of the workpiece W is switched gradually in tracing from the changing status in the second feedback control to the changing status in the first feedback control between the size signal P3 and a time when the above-identified predetermined time is reached. Then, the diameter of workpiece W is changed in tracing the changing status in the first feedback control after the above-identified predetermined time is passed as explained previously in the first embodiment.

Effects of the Second Embodiment of the Present Invention

The second embodiment of the present invention explained above has following effects.

The X-axis servo driver 33 is switching from the second feedback control to the first feedback control between the time of the size signal P3 and the time when the above-identified predetermined time is reached. The second feedback control is executed until the grinding wheel 40 contacts with the workpiece W and in the rough grinding process after the grinding wheel 40 contacts the workpiece W. Since the first feedback control cannot execute until the diameter of the workpiece W is reduced by the grinding, the second feedback control is executed at least until the grinding wheel 40 contacts with the workpiece W so that the X-axis control of the wheel slide 21 can be executed firmly. And also the first feedback control can be executed at a time when the diameter of the workpiece W is actually reducing after the size signal P3 is output. Therefore, the first and the second feedback controls are executed certainly so that each of effects of the first and second feedback control can be achieved.

The switching process from the second feedback control to the first feedback control is smoothly executed since the output from the second feedback control to the X-axis servo motor 32 is gradually reduced and the output from the first feedback control to the X-axis servo motor 32 is gradually increased. Thereby, trouble in switching from the second feedback control to the first feedback control will not occur.

Variation of the Second Embodiment of the Present Invention

Figure 9A:
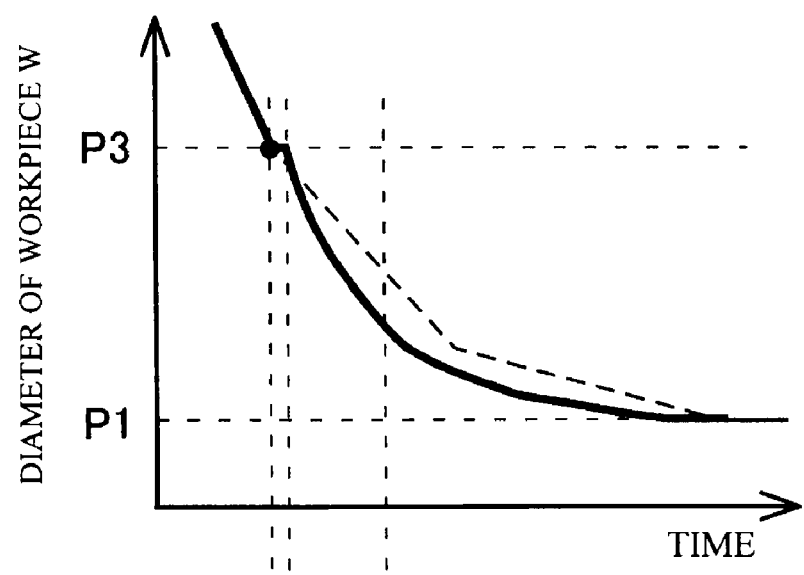
FIG. 9a is a graph showing a changing status of the outer diameter of the workpiece according to a time passing at switching from the second feedback control to the first feedback control in another embodiment of the second embodiment.
Figure 9B:
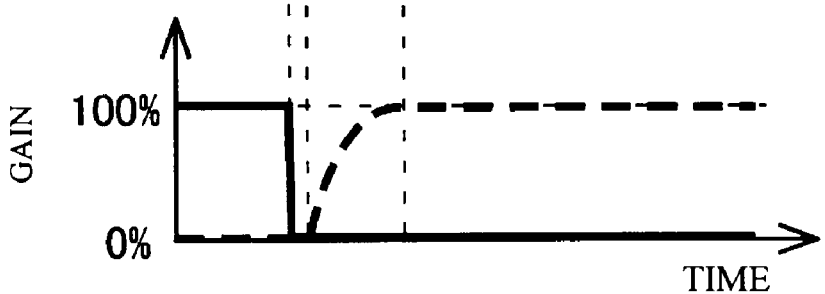
FIG. 9b is a graph showing a first gain and a second gain.

A variation of the second embodiment will be explained hereinafter referred to FIG. 9. The grinding machine in the variation of the second embodiment has a different first gain in the first gain regulation portion 107 and a different second gain in the second gain regulation portion 103 as compared to the second embodiment. Therefore, only differences are explained hereinafter. In FIG. 9a, a solid line shows a status change of the outer diameter of the workpiece W by the variation of the second embodiment, a dotted line shows a status change by the second feedback control only. In FIG. 9b, the solid line shows the second gain and the dotted line shows the first gain. The lateral axis of the time in FIG. 9b corresponds to that in FIG. 9a.

The second gain in this variation is maintained at 100% until the size signal P3 is output, and changes instantly to zero (0%) at the time of the output of the size signal P3 as shown by the solid line in FIG. 9b.

The first gain in this variation is maintained zero (0%) until the size signal P3 is output and the second gain has been changed to 0%, and thereafter increased gradually to 100% until the second gain has been completely changed to zero (0%) and a predetermined time is passed, as shown by the dotted line in FIG. 9b. An increasing rate of the first gain is set larger at the beginning and is thereafter decreased gradually.

Therefore, the first gain is gradually increased from zero after the size signal P3 is output and the second gain has been changed to 0% from 100%. In other words, the X-axis servo driver 33 increases the influence from the first feedback control after the influence from the second feedback control has been finished at the switching from the second feedback control to the first feedback control.

The diameter of the workpiece W is reduced as shown in the solid line of FIG. 9a in accordance with changes in the first gain and the second gain. The reduction of the diameter follows the control by the second feedback control until the size signal P3 is output. In the very short time between the time of the size signal P3 and the predetermined time, the workpiece W is ground on the basis of inertia movement of the wheel slide 21.

Then, the reduction of the diameter controlled by the second feedback control is gradually transited to that based on control by the first feedback control until the predetermined time is passed from the size signal P3. Therefore, the reduction of the diameter follows the control by the first feedback control after the predetermined time is passed. Thus, it can be smoothly switched from the second feedback control to the first feedback control by changing the second gain and the first gain.

Further Variation of the Second Embodiment of the Present Invention

Figure 10A:
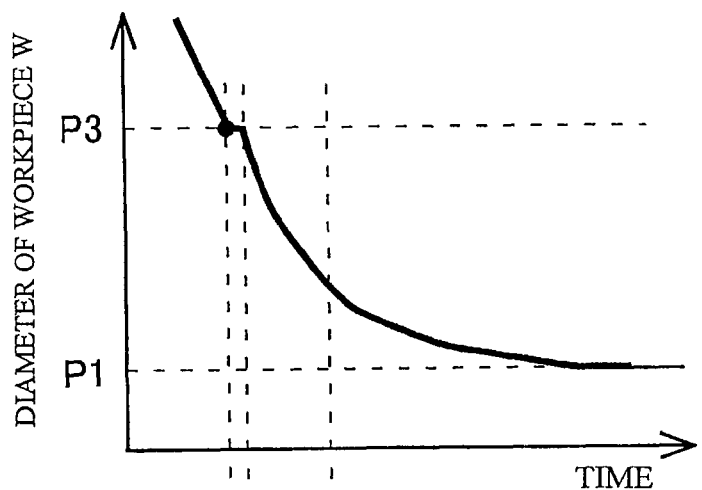
FIG. 10a is a graph showing a changing status of the outer diameter of the workpiece according to a time passing at switching from the second feedback control to the first feedback control in a variation of the second embodiment.
Figure 10B:
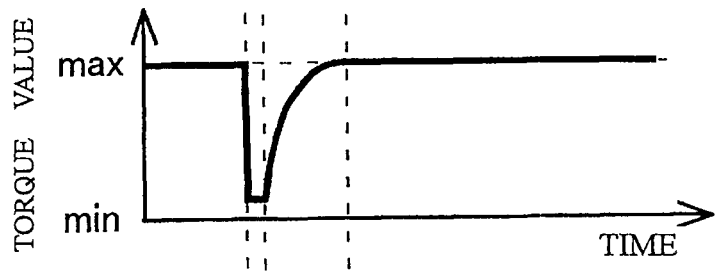
FIG. 10b is a graph showing a torque value.
Figure 10C:
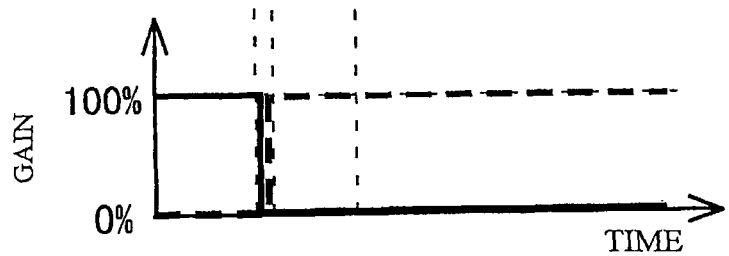
FIG. 10c is a graph showing a first gain and a second gain.

A further variation of the second embodiment will be explained hereinafter referred to FIG. 10. The grinding machine in the further variation of the second embodiment adds a torque limit to the X-axis servo motor 32 of the previously explained variation of the second embodiment. Therefore, only differences are explained hereinafter. In FIG. 10a, a solid line shows a status change of the outer diameter of the workpiece W over time in the present variation of the second embodiment. FIG. 10b shows the torque limit in the current control portion 110 of the X-axis servo driver 33. In FIG. 10c, the solid line shows the second gain and the dotted line shows the first gain. The lateral axes of the time in FIGS. 10a, 10b and 10c correspond to each other.

The current control portion 110 can change a limitation of torque to the X-axis servo motor 32. The current control portion 110 executes the current control such that the current in each phase of the X-axis servo motor 32 equals the current commanded value being output from the velocity control portion 109. In this case, the upper limit of the current being output to the X-axis servo motor 32 is limited by the torque limitation in the current control portion 110.

As shown in FIG. 10b, the maximum value of the torque in the X-axis servo motor 32 is maintained at 100% until the size signal P3 is output and the value of the torque drops to 10% of the maximum value of the torque by the torque limitation in the current control portion 110 immediately after the size signal P3 is output. Then, the torque value is maintained at 10% of the maximum value of the torque for a predetermined time period, and thereafter increased gradually to the maximum value at another predetermined time.

The first gain is maintained at 0% until the size signal P3 and is increased to 100% in the time interval of the former predetermined period as shown in the dotted line of FIG. 10c. The second gain is maintained at 100% until the size signal P3 and is decreased to 0% at the time interval of the former predetermined period as shown in the solid line of FIG. 10c. Therefore, it is switched gradually from the second feedback control to the first feedback control during the torque limitation.

The diameter of the workpiece W is reduced as shown in the solid line of FIG. 10a in accordance with changes in the torque value, the first gain and the second gain. The reduction of the diameter follows the control by the second feedback control until the size signal P3 is output. Between the time of the size signal P3 and the former predetermined time, the workpiece W is still ground on a basis of inertia movement of the wheel slide 21.

Then, the reduction of the diameter controlled by the second feedback control is gradually transited to that based on the control by the first feedback control until the former and latter predetermined times pass from the size signal P3. Therefore, the reduction of the diameter follows in accordance with the control by the second feedback control after the predetermined time is passed. Thus, it can be smoothly switched from the second feedback control to the first feedback control by changing the torque value, the second gain and the first gain.

While the invention has been described in detail with reference to the preferred embodiment, it will be apparent to those skilled in the art that the invention is not limited to the present embodiment, and that the invention may be realized in various other embodiments within the scope of the claims.

For example, while the sizing device is provided for measuring the outer diameter of the workpiece W, it may be constructed to measure an internal diameter, an end surface position or a width along the axial direction of the workpiece W.

While the grinding machine is explained as example of the machine tool, it may be other machine tool such as a lathe, a machining center, etc. In the case of the machining center, the tool may be an end mill, a milling tool, a drill or a grinding wheel. In the case of the lathe, the tool may be a cutting tool. Especially in a compound lathe, the tool may be not only a cutting tool but also an end mill, a milling tool, a drill or a grinding wheel.

What is claimed is:

1. A machine tool comprising:
   a tool supporting member relatively movable to a workpiece along a predetermined axis;
   a servo motor configured to drive said tool supporting member to said workpiece along said predetermined axis;
   a sizing sensor configured to measure a profile of said workpiece machined by said tool and to output a size deviation of measured values from a target profile;
   a position detector configured to detect at least one of a relative position of said tool supporting member to said workpiece along said predetermined axis and a rotational position angle of said servo motor;
   a servo driver configured to drive said servo motor and comprising:
     a first feedback control having an output based on said size deviation output from said sizing sensor and configured drive said servo motor to make said size deviation to zero;
     a second feedback control based on an output of said position detector,
     wherein said servo driver is configured to switch from control based entirely on said second feedback control to control based entirely on said first feedback control.

2. A machine tool according to claim 1, wherein said gain of said position control is variable.

3. A machine tool according to claim 2, wherein:
   said gain of said position control is set variably on a basis of a changed amount; and
   said changed amount is that of said size deviation being output from said sizing sensor.

4. A machine tool according to claim 2, wherein:
   said tool is a grinding wheel;
   said tool supporting member has a driving motor driving said grinding wheel rotatably;
   said machine tool further comprises a rotational driving force detecting portion detecting rotational driving force of said grinding wheel; and
   said gain of said position control is set variably corresponding to said rotational driving force.

5. A machine tool according to claim 1, wherein said servo driver is configured to gradually decrease a degree of influence of said second feedback and increase a degree of influence of said first feedback control when switching from said second feedback control to said first feedback control.

6. A machine tool according to claim 5, wherein said servo driver is configured to simultaneously start to decrease a degree of influence of said second feedback gradually and to increase a degree of influence of said first feedback control gradually when said servo driver starts to switch from said second feedback control to said first feedback control.

7. A machine tool according to claim 5, wherein said servo driver is configured to gradually increase a degree of influence of said first feedback control after said servo driver decreases a degree of influence of said second feedback, where said servo driver switches from said second feedback control to said first feedback control.

8. A machine tool according to claim 5, wherein:
said servo driver executes first position control in said first feedback control to said size deviation to make said size deviation to zero and executes second position control in said second feedback control to a position deviation of said relative position of said tool supporting member to said workpiece;
said degree of influence to said first feedback control is a gain of said first position control in said first feedback control; and
said degree of influence to said second feedback control is a gain of said second position control in said second feedback control.

9. A machine tool according to claim 5, wherein:
said servo driver increases a torque limit to said servo motor before said servo driver switches from said second feedback control to said first feedback control or where said servo driver starts to switch from said second feedback control to said first feedback control;
said servo driver switches from said second feedback control to said first feedback control after said torque limit is decreased; and
said servo driver increases said torque limit gradually after said servo driver switches from said second feedback control to said first feedback control.

10. A controlling method of a machine tool comprising the steps of:
moving a tool supporting member relatively to a workpiece along a predetermined axis at a relatively rapid feed velocity by a servo motor, said tool supporting member supporting a tool;
detecting a relative position of said tool supporting member to said workpiece along said predetermined axis or a rotational position angle of said servo motor by a position detector;
controlling said servo motor by a servo driver in second feedback control based on information detected by said position detector;
measuring a profile of said workpiece machined by said tool by a sizing sensor;
outputting a size deviation of measured values of said profile of said workpiece from a target profile;
controlling said servo motor by said servo driver in first feedback control based on said size deviation being output from said sizing sensor; and
switching said feedback control from control based entirely on said second feedback control to control based entirely on said first feedback control, by said servo driver.

* * * * *